United States Patent
Guo

(10) Patent No.: US 8,611,085 B2
(45) Date of Patent: Dec. 17, 2013

(54) LATCHING MECHANISM AND ELECTRONIC DEVICE

(75) Inventor: Ji-Bing Guo, Shenzhen (CN)

(73) Assignees: Fu Tai Hua Industry (Shenzhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 16 days.

(21) Appl. No.: 13/489,613

(22) Filed: Jun. 6, 2012

(65) Prior Publication Data

US 2013/0100608 A1   Apr. 25, 2013

(30) Foreign Application Priority Data

Oct. 25, 2011   (CN) .......................... 2011 1 0327380

(51) Int. Cl.
| | |
|---|---|
| *H05K 5/00* | (2006.01) |
| *H05K 7/00* | (2006.01) |
| *G06F 1/16* | (2006.01) |
| *E05C 17/56* | (2006.01) |
| *E05C 19/16* | (2006.01) |

(52) U.S. Cl.
USPC ............ 361/679.58; 361/679.26; 361/679.55; 292/251.5

(58) Field of Classification Search
USPC ......... 361/679.26, 679.55, 679.58; 292/251.5
See application file for complete search history.

(56) References Cited

U.S. PATENT DOCUMENTS

| | | | |
|---|---|---|---|
| 6,256,194 B1 * | 7/2001 | Choi et al. | 361/679.58 |
| 6,517,129 B1 * | 2/2003 | Chien et al. | 292/251.5 |
| 7,181,238 B2 * | 2/2007 | Chiang | 455/556.1 |
| 7,185,927 B2 * | 3/2007 | Talukdar et al. | 292/172 |
| 7,261,331 B2 * | 8/2007 | Lin | 292/116 |
| 8,085,533 B2 * | 12/2011 | Zhao et al. | 361/679.58 |
| 8,355,250 B2 * | 1/2013 | Yu | 361/679.58 |
| 2005/0087993 A1 * | 4/2005 | Lin | 292/45 |
| 2011/0026197 A1 * | 2/2011 | Zhao et al. | 361/679.01 |

\* cited by examiner

*Primary Examiner* — Anthony Haughton
(74) *Attorney, Agent, or Firm* — Altis Law Group, Inc.

(57) ABSTRACT

An electronic device includes a main body, a cover, and a latching mechanism latching the cover to the main body. The latching mechanism includes a latching assembly and a hook assembly secured to the cover. The latching assembly includes at least one latching member slidably received in the main body. The hook assembly includes at least one hook member. The at least one hook member engages with the at least one latching member to latch the cover to the main body, and disengages from the at least one latching member allowing the cover to unlatch from the main body. The at least one hook member is hidden in the cover when the cover is unlatched from the main body, and extends out of the cover engaging with the at least one latching member latching the cover to the main body. A latching mechanism is also provided.

15 Claims, 8 Drawing Sheets

LATCHING MECHANISM AND ELECTRONIC DEVICE

BACKGROUND

1. Technical Field

The present disclosure relates to electronic devices; and particularly to an electronic device having a latching mechanism.

2. Description of Related Art

A conventional electronic apparatus includes a main body and a cover. The cover is pivotally attached to the main body for folding over the main body. The cover includes a hook, and the main body includes a locking slot. When the cover covers the main body, the hook of the cover deforms in order to pass through the locking slot and hooks to the main body securing the cover to the main body. However, when the cover is unfolded, the hook extends out of the cover and may be inconvenient to users.

Therefore, there is room for improvement in the art.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the embodiments. Moreover, in the drawings, like reference numerals designate corresponding parts throughout the eight views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Figure 1:
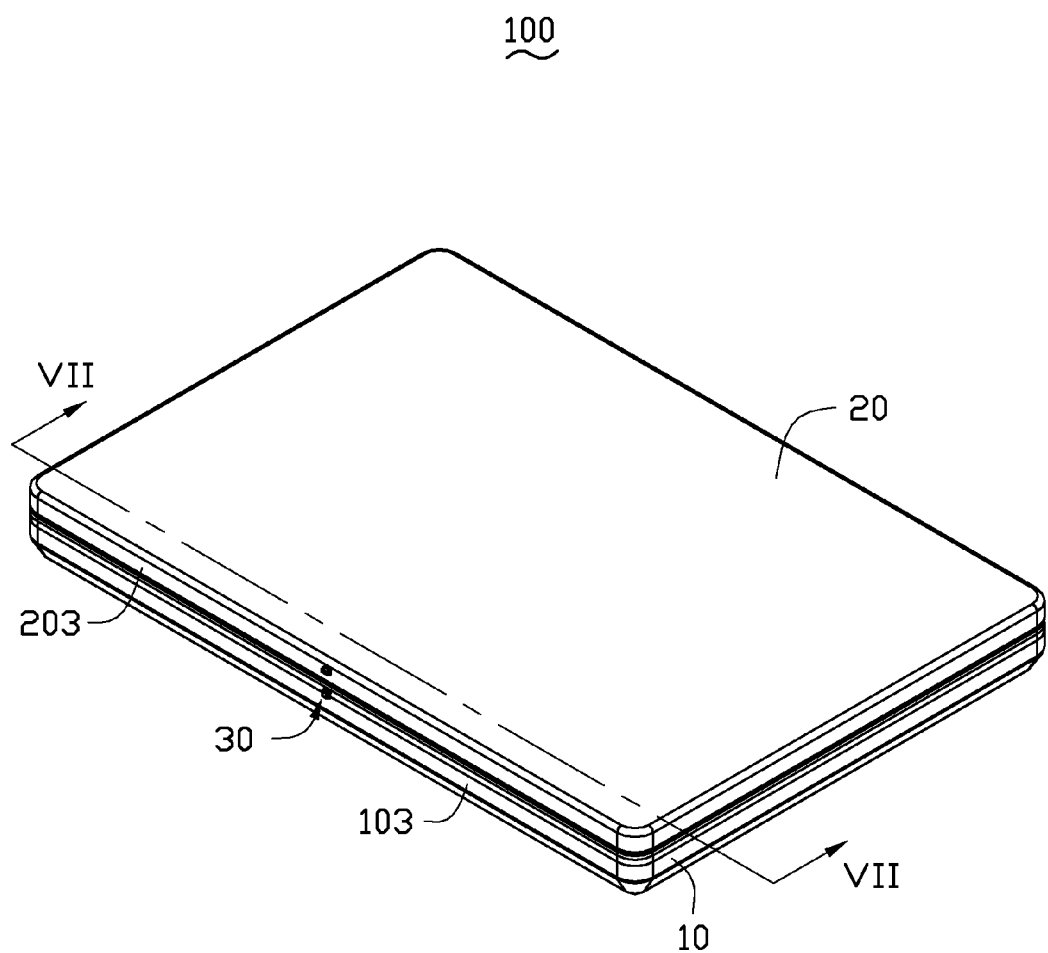
FIG. 1 is a perspective view of an electronic device having a body and a cover rotatably latched to the body in accordance with an embodiment.

FIG. 1, is a perspective view of an electronic device 100 in accordance with an embodiment. The electronic device 100 includes a main body 10, a cover 20 rotatably coupled to the main body 10, and a latching mechanism 30 for latching the cover 20 to the main body 10. In the embodiment, the electronic device 100 may be a notebook computer.

Figure 2:
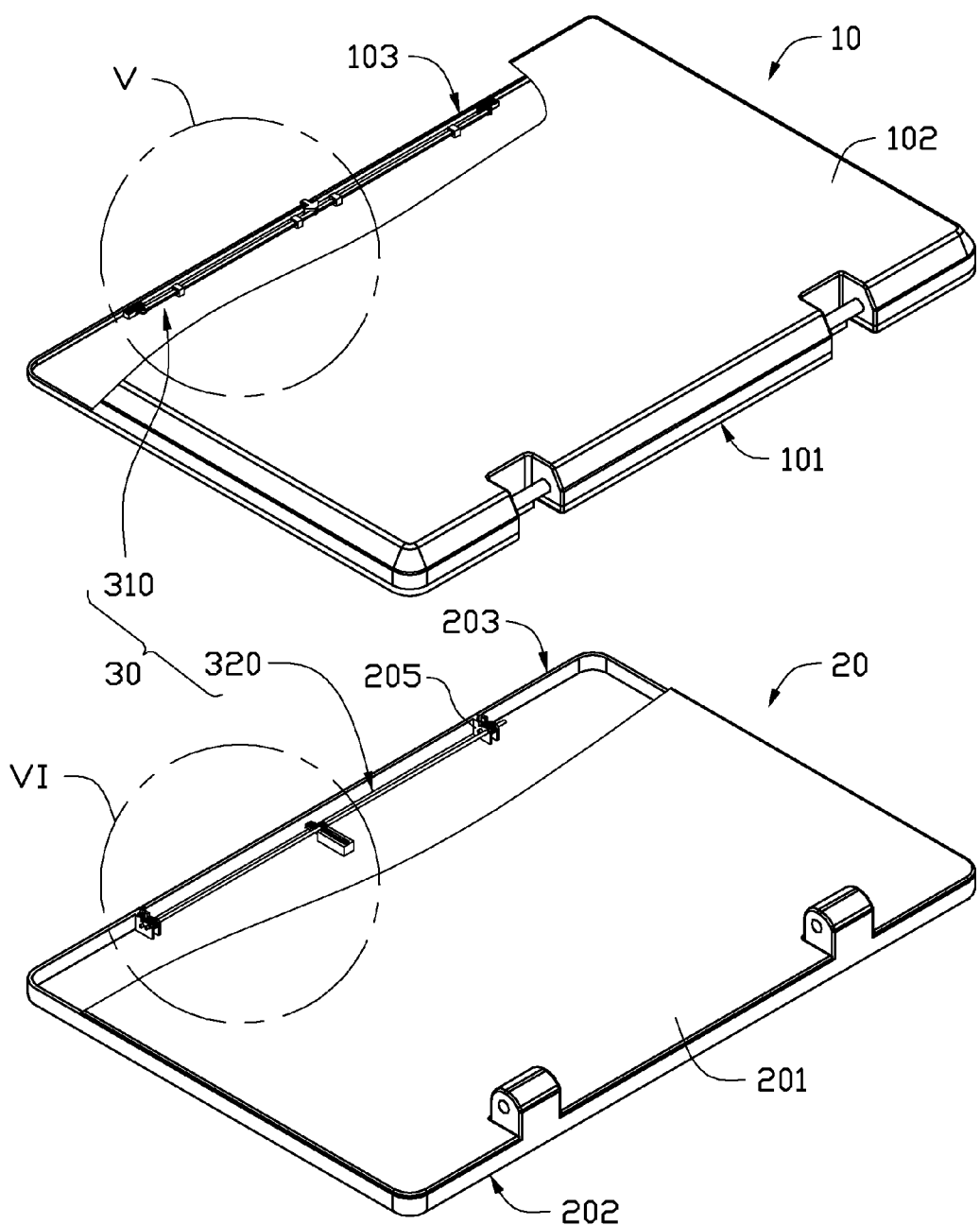
FIG. 2 is a partially disassembled perspective view of the electronic device of FIG. 1.
Figure 3:
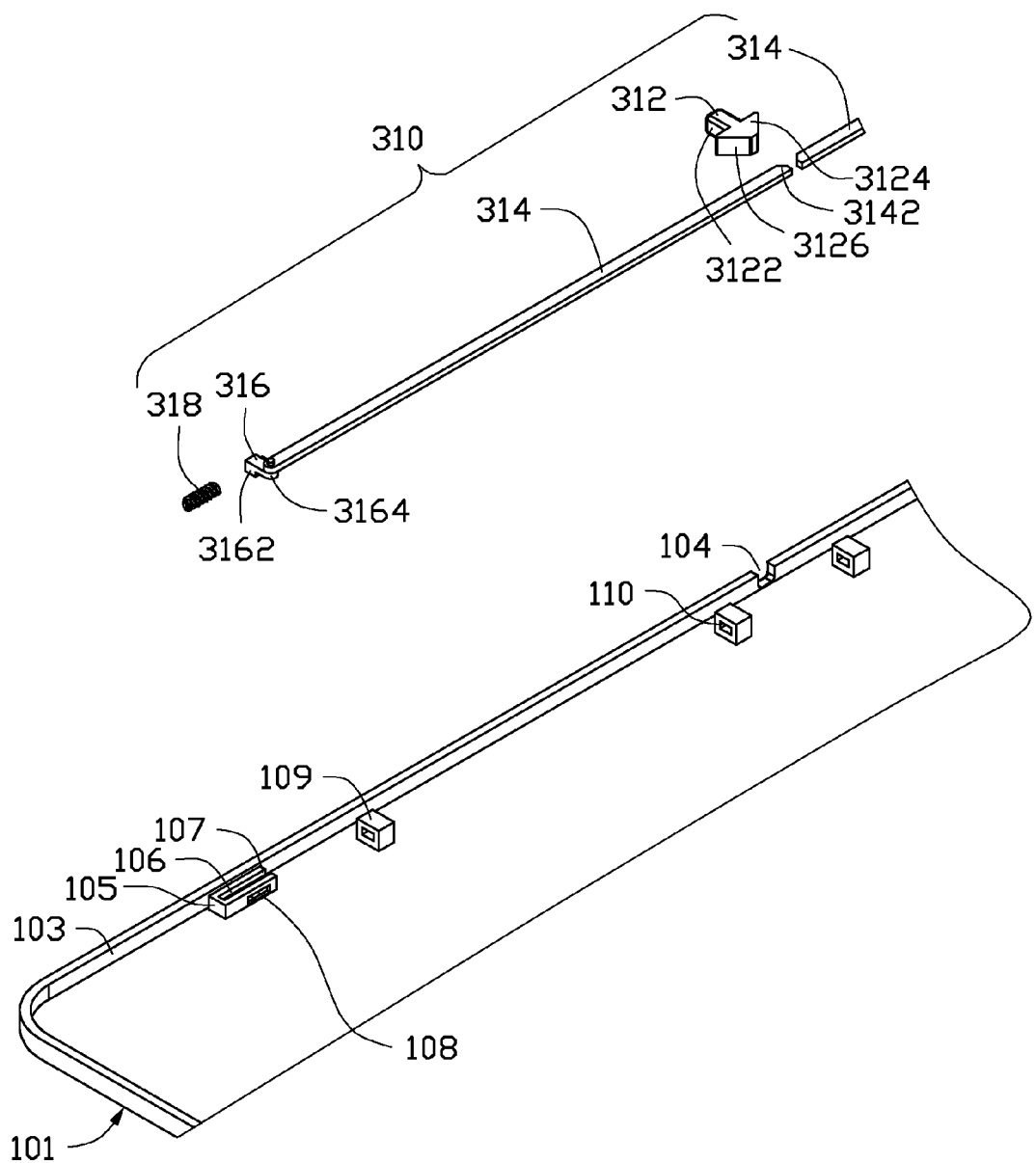
FIG. 3 is a partially disassembled view of the cover of the electronic device of FIG. 2.

FIGS. 2-3, illustrate the main body 10 which is substantially rectangular, and includes a top surface 101, a bottom surface 102 opposite to the top surface 101 and four sidewalls. The top surface 101, the bottom surface 102, and the sidewalls cooperatively define a receiving space (not labeled) for receiving a motherboard, a DVD drive, and a power supply, for example. When the electronic device 100 is in use, one of the sidewalls facing a users (hereinafter, the front sidewall 103) defines a cutout 104. Two stopping members 105 are secured to and are spaced from each other on an inner surface of the front sidewall 103. The stopping members 105 are symmetrical to each other relative to the cutout 104. Each stopping member 105 defines a receiving slot 106 extending in a direction parallel to the front sidewall 103. An end of the receiving slot 106 adjacent to the cutout defines an opening 107. An end of the stopping member 105 away from the front sidewall 103 defines an elongated hole 108. The elongated hole 108 communicates with the receiving slot 106. The top surface 101 further defines two first guiding holes (not shown) communicating with the receiving slot 106. Two pairs of supporting members 109 are positioned at an inner surface of the top surface 101. The two pairs of the supporting members 109 are arranged between the two stopping members 105. Each supporting member 109 defines a through hole 110. The through holes 110 and the receiving slot 106 are aligned parallel to the front wall 103.

Figure 4:
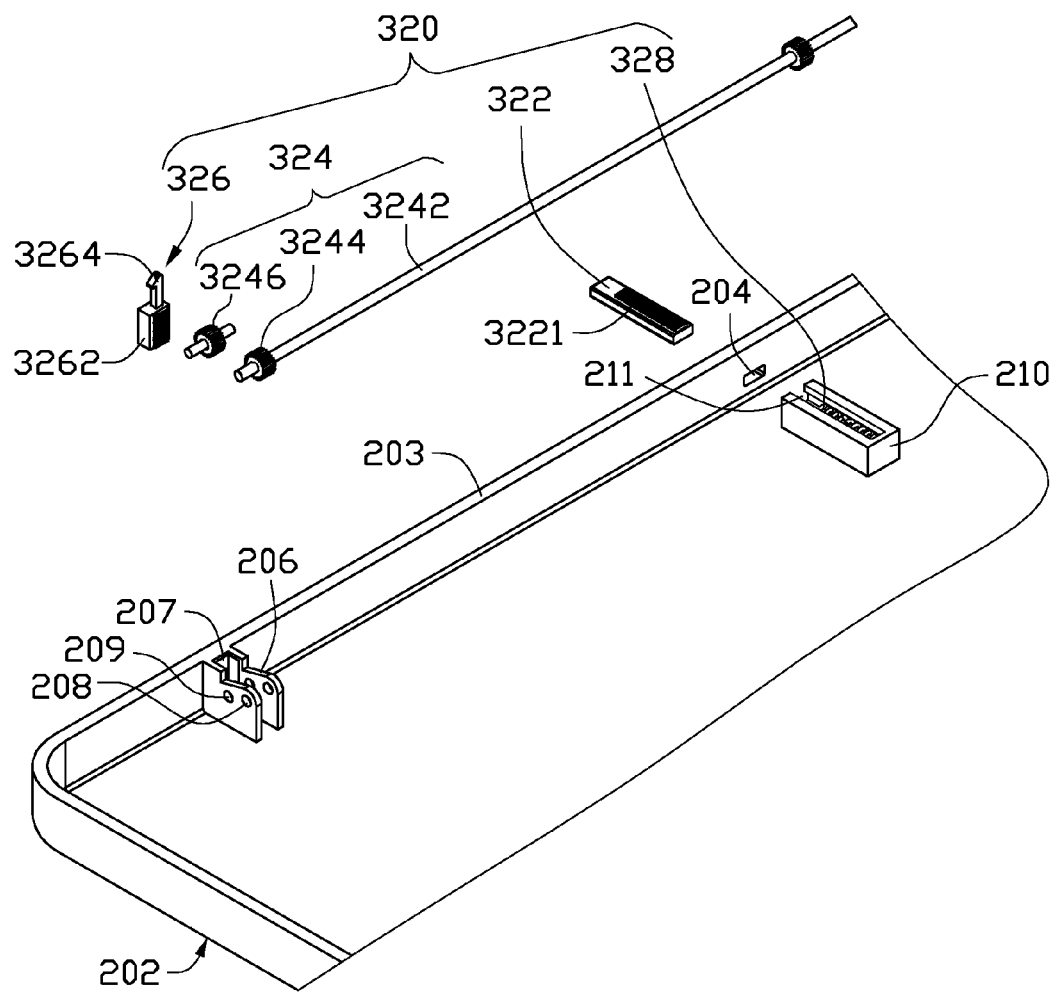
FIG. 4 is a partially disassembled view of the body of the electronic device of FIG. 2.

FIG. 4, shows the cover 20 which is substantially rectangular, and functions as the display device of the electronic device 100. The cover 20 includes a first surface 201, a second surface 202 opposite to the first surface 201, and four side portions. The first surface 201 includes a display 40 corresponding to the top surface 101. One of the end portions corresponding to the front sidewall 103 (hereinafter, the front end portion 203) defines an aperture 204. The first surface 201 defines two second guiding holes (not shown) corresponding to the two first guiding holes.

Two bearings 205 (see FIG. 2) are secured to an inner surface of the front end portion 203. The bearings 205 correspond to the second guiding holes respectively. The two bearings 205 are symmetrical to each other relative to the aperture 204. Each bearing 205 includes two supporting plates 206. The two supporting plates 206 are parallel to each other and are perpendicular to the front end portion 203. The two supporting plates 206 are spaced from each other to define a receiving portion 207. The two supporting plates 206 define two corresponding first pivot holes 208. The first pivot holes 208 are adjacent to an end of the supporting plates 206 away from the front end portion 203. The two supporting plates 206 further define two corresponding second pivot holes 209. The second pivot holes 209 are arranged between the first pivot holes 208 and the front end portion 203.

A limiting member 210 is positioned on an inner surface of the first surface 202. The limiting member 210 is perpendicular to the front end portion 203. The limiting member 210 defines a guiding slot 211. The guiding slot 211 corresponds to the aperture 204 and extends in a direction perpendicular to the front end portion 203.

The latching mechanism 30 includes a latching assembly 310 secured to the main body 10 and a hook assembly 320 secured to the cover 20. The hook assembly 320 engages with the latching assembly 310 to latch the cover 20 to the main body 10, and disengages with the latching assembly 310 to allow the cover 20 to be unlatched from the main body 10.

FIG. 3, shows the latching assembly 310 including a first actuating member 312, two connection posts 314, two latching members 316 and two first elastic members 318. The first actuating member 312 looks like an arrow. The first actuating member 312 includes an operating portion 3122 and an abutting portion 3124 fixed to an end of the operating portion 3122. The operating portion 3122 is slidably received in the cutout 104. An end of the abutting portion 3124 defines two inclined surfaces 3126.

The connecting posts 314 are slidably received in the two pair of through holes 110 respectively. An end of each connecting post 314 defines a slanted surface 3142. The slanted surfaces 3142 correspond to and engage with the inclined surfaces 3126 respectively.

The latching members 316 are respectively secured to the ends of the connecting posts 314 away from the slanted surface 3142. Each latching member 316 includes a latching portion 3162 and a connecting portion 3164 for connecting the latching portion 3162 to the connecting post 314. The latching portion 3162 is slidably received in the receiving slot 106. The connecting portion 3164 is slidably received in the elongated hole 108. The latching member 316 slides between a locking position with the connecting portion 3164 abutting an end of the elongated hole 108 adjacent to the cutout 104 and an unlocking position with the connecting portion 3164 abutting an end of the elongated hole 108 away from the cutout 104.

Each first elastic member 318 is received in the received slot 106 and abuts an end of the latching members 316 opposite to the connecting post 314. The first elastic members 318 provide an elastic force for driving the latching members 316 to move toward each other.

FIG. 4, also shows the hook assembly 320 including a second actuating member 322, a transmitting member 324, two hook members 326 and a second elastic member 328. The second actuating member 322 is slidably received in the aperture 204. The second actuating member 322 defines a plurality of first teeth 3221.

The transmitting member 324 includes a transmitting post 3242, three drive gears 3244, and two slave gears 3246. The transmitting post 3242 is pivotally received in the first pivot holes 208. Two of the drive gears 3244 (hereinafter, two first drive gears) are secured to opposite ends of the transmitting post 3242 and are received in the receiving portion 207 respectively, and the other one of the drive gears 3244 (hereinafter, the second drive gear) is secured to the middle of the transmitting post 3242 and gearingly engaged with the second actuating member 322. The slave gears 3246 are pivotally coupled to the bearings 205 rotatably received in the second pivot holes 209. The slave gears 3246 gearingly engages with the first drive gears respectively.

The hook members 326 are slidably received in the receiving portions 207 respectively. Each hook member 326 includes a toothed portion 3262 and a hook portion 3264 secured to an end of the toothed portion 3262. The toothed portion 3262 defines a plurality of second teeth (not labeled) gearingly engaged with the slave gears 3246. The hook portion 3264 is engageable with the latching portion 3162 to latch the cover 20 to the main body 10.

The second elastic member 328 is received in the guiding slot 211 and abuts an end of the second actuating member 322. When the second actuating member 322 is released, the second elastic member 328 provides an elastic force for driving the second actuating member 322 to slide out of the cover 20.

Figure 5:
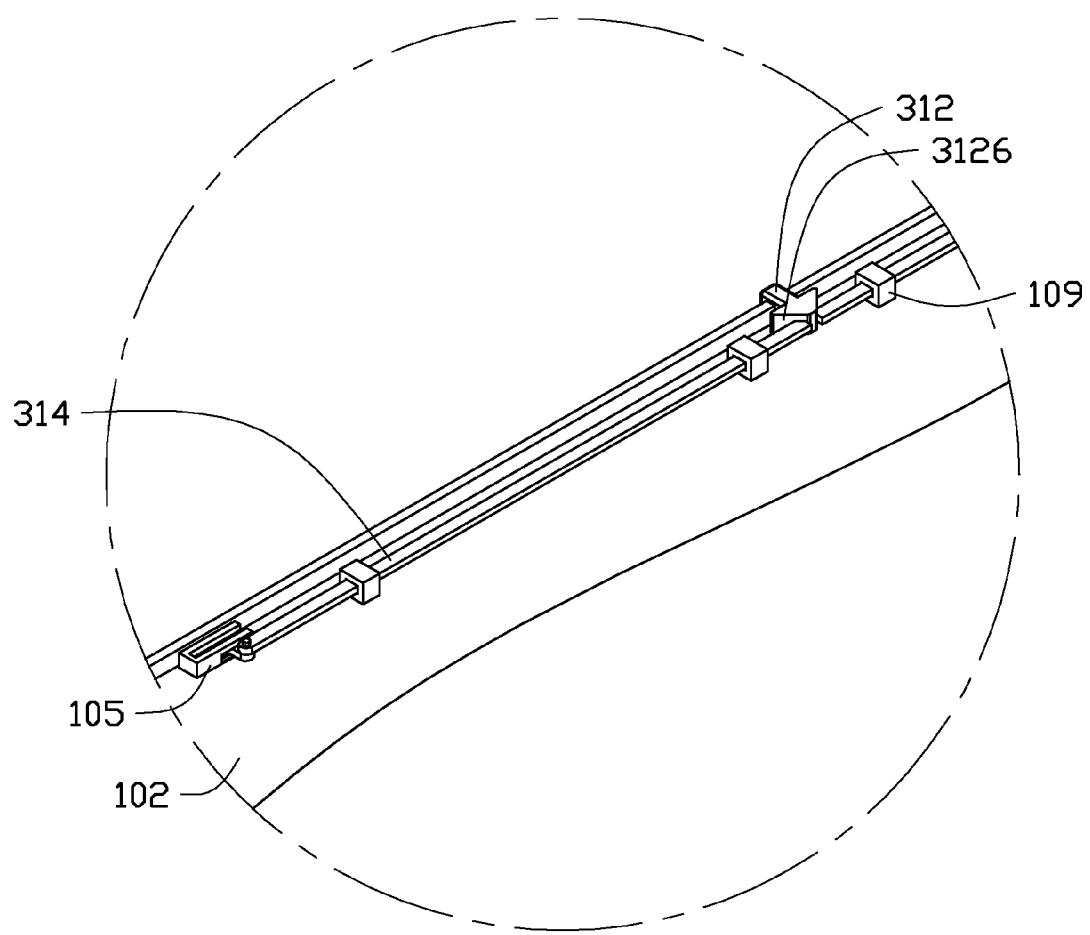
FIG. 5 is an enlarged view of portion V of the electronic device of FIG. 2.

FIG. 5, shows in assembly, the latching assembly 310 is mounted to the main body 10: First, the first elastic members 318 and the latching portions 3162 are received in the receiving slot 106 in order; Second, the connecting portions 3164 are received in the elongated holes 108; Third, the connecting posts 314 are received in the through holes 110 with an end fixed to the connecting portions 3164; Finally, the first actuating member 312 is received in the cutout 104 with the inclined surfaces 3126 abutting the slant surfaces 3142 respectively.

Figure 6:
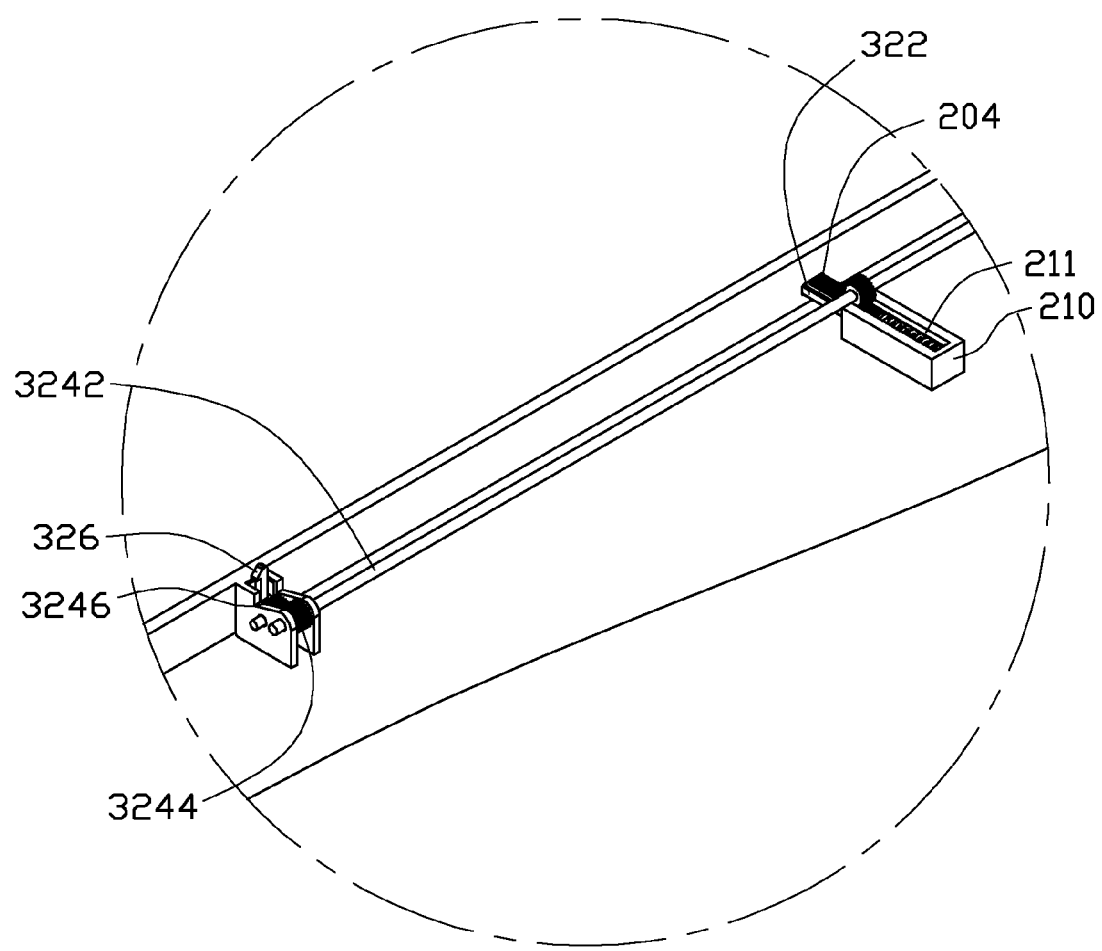
FIG. 6 is an enlarged view of portion VI of the electronic device of FIG. 2.

FIG. 6, shows the hook assembly 320 is mounted to the cover 20: First, the hook members 326 are received in the receiving portions 207 respectively with the hook portions 3264 hidden in the cover 20; Second, the slave gears 3246 are rotatably coupled to the bearings 205 and engaged with the hook members 326 respectively. Third, the transmitting post 3242 is rotatably received in the first pivot holes 208 with the first drive gears being received in the receiving portions 207 and engaging with the slave gears 3246; Then, the second elastic member 328 is received in the guiding slot 211; Finally, the second actuating member 322 is slidably received in the aperture 204 and gearingly engages with the second drive gear, and an end of the second actuating member 322 is received in the guiding slot 211 and abuts the second elastic member 328.

Figure 7:
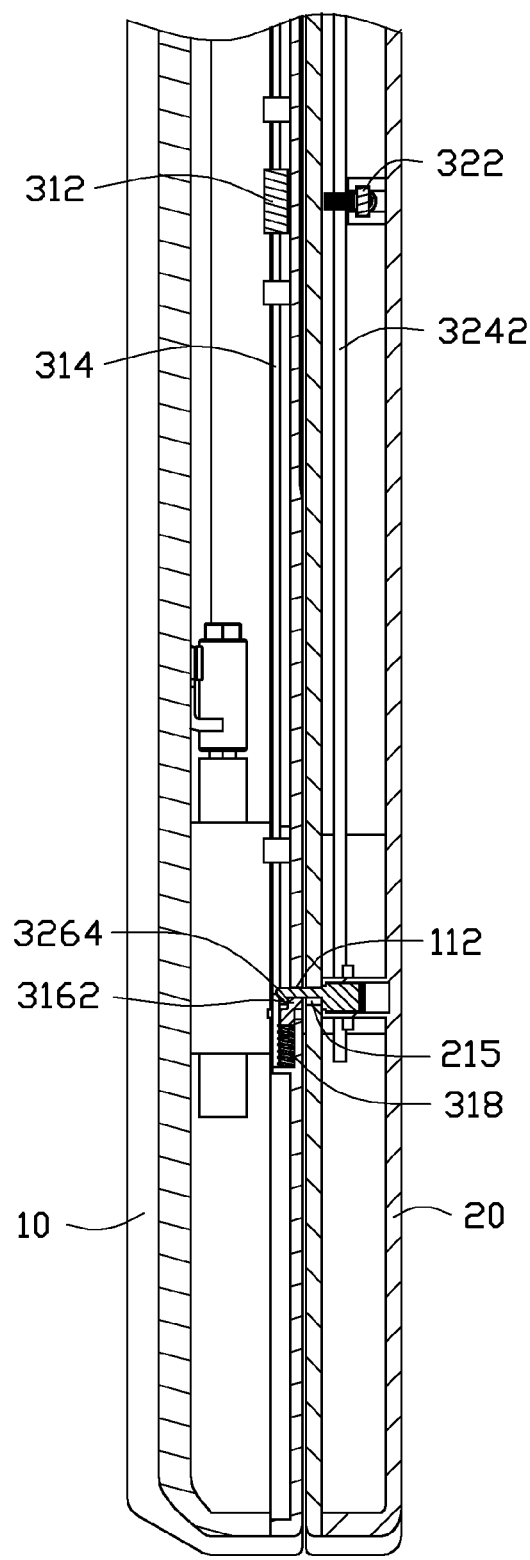
FIG. 7 is a cross-sectional view of the electronic device taken along line VII-VII in FIG. 1.

FIGS. 6-7, illustrate latching the cover 20 to the main body 10: First, the cover 20 covers on the main body 10; Then, the first actuating member 322 is pressed to slide into the cover 20 to elastically deform the second elastic member 328, at the same time, the drive gears 3244 and the transmitting posts 3242 are driven to rotate in a first direction (for example, anticlockwise), and the slave gears 3246 are driven to rotated clockwise, thus, the hook members 326 pass through the second guiding holes to extend out of the first surface 201 of the cover 20 and pass through the first guiding holes defined in the top surface 101 to hook the latching portions 3162. As a result, the cover 20 is latched to the main body 10, and the latching members 316 remain in the locked position.

Figure 8:
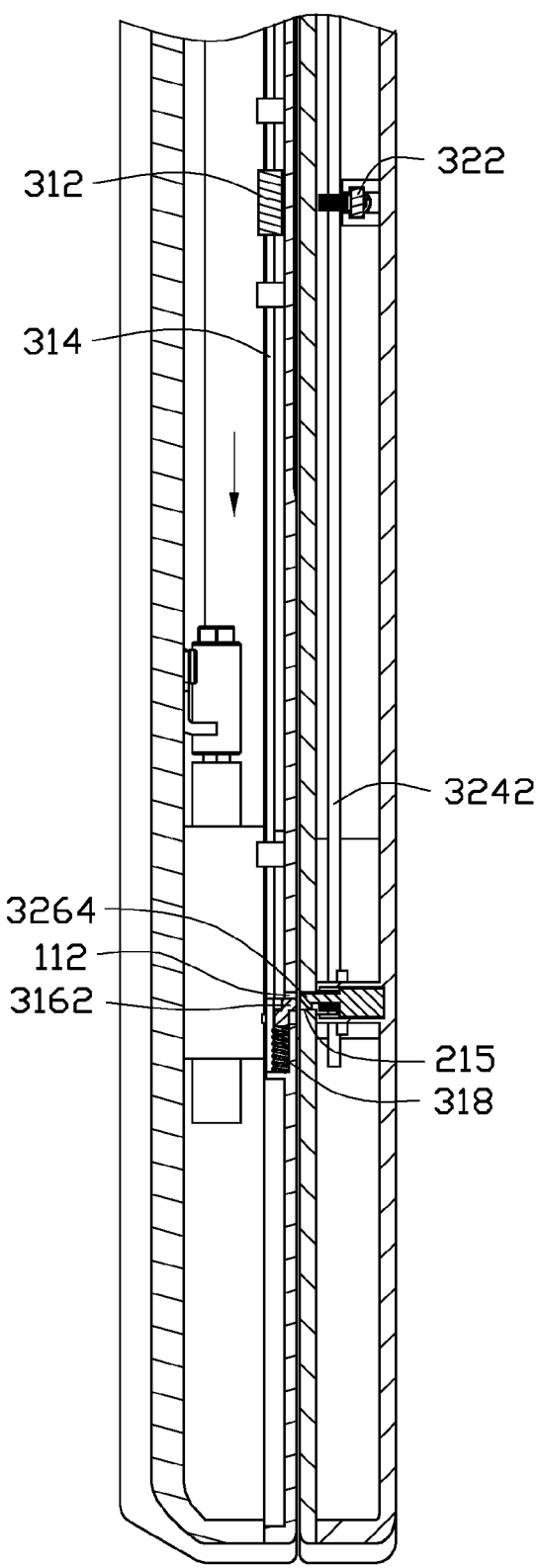
FIG. 8 is a perspective view for showing the cover being unlatched from the body.

FIG. 5 and FIG. 8, illustrate unlatching the cover 20 from the main body 10: The second actuating member 312 is pressed to slide into the main body 10, the connecting posts 314 are driven to slide in a reverse direction by the inclined surfaces 3126 engaging with the slant surfaces 3142; The latching members 316 move away from each other to be in the unlocking position. At this time, the first elastic members 318 are elastically deformed by the latching members 316, and the hook portions 3264 are allowed to disengage with the latching member 316. As a result, the cover 20 is unlatched from the main body 10 and is capable of being unfolded.

After the cover 20 is unlatched from the main body 10, the first actuating member 312 is released, and the latching members 316 return to the locking position by the elastically deformed first elastic member 318. At the same time, the second actuating member 322 is driven to extend out of the cover 20 by the elastically deformed second elastic member 328, the drive gears 3244 and the transmitting posts 3242 are driven to rotate in a second direction reverse to the first direction (for example, clockwise), and the hook members 326 retract into the cover 20 to be hidden again. As a result, when the cover 20 is unfolded, the hook members 316 are hidden to prevent users from being inconvenienced.

It is to be understood, even though information as to, and advantages of, the present embodiments have been set forth in the foregoing description, together with details of the structures and functions of the present embodiments, the disclosure is illustrative only; and that changes may be made in detail, especially in the matters of shape, size, and arrangement of parts within the principles of the present embodiments to the full extent indicated by the broad general meaning of the terms in which the appended claims are expressed.

What is claimed is:

1. A latching mechanism for latching a cover to a main body of an electronic device, comprising:
 a latching assembly secured to the main body, the latching assembly comprising at least one latching member slidably received in the main body, the at least one latching member capable of sliding between a locking position for latching the cover to the main body and an unlocking position for allowing the cover to disengaging from the main body; and a hook assembly secured to the cover, the hook assembly comprising at least one hook member, the at least one hook member capable of engaging with the at least one latching member to latch the cover to the main body when the at least one latching member is in the locking position, and capable of disengaging with the at least one latching member to allow the cover to be unlatched from the main body when the at least one latching member is in the unlocking position;

wherein the at least one hook member is hidden in the cover when the cover is unlatched from the main body, and the at least one hook member is operable to extend out of the cover to engage with the at least one latching member to latch the cover to the main body; and wherein the hook assembly further comprises a second actuating member, the second actuating member is slidably mounted to and protrudes out of the cover for allowing manual operation, the second actuating member drives the hook member to extend out of the cover when pressed.

2. The latching mechanism of claim 1, wherein the latching assembly further comprises a first actuating member slidably secured to the main body, the first actuating member is operable to drive the at least one latching member to slide from the locking position to the unlocking position.

3. The latching mechanism of claim 2, wherein the latching assembly further comprises at least one connecting post, that at least one connecting post abuts the first actuating member, the at least one latching member is secured to an end of the at least one connecting post away from the first actuating member.

4. The latching mechanism of claim 3, wherein the first actuating member defines at least one inclined surface, the at least one connecting post abuts the at least one inclined surface.

5. The latching mechanism of claim 2, wherein the latching assembly further comprises at least one first elastic member, the at least one first elastic member abuts an end of the at least one latching member opposite to the first actuating member and is used to drive the at least one latching member to slide from the unlocking position to the locking position when the first actuating member is released.

6. The latching mechanism of claim 1, wherein the hook assembly further comprises a transmitting member gearingly engaging with the second actuating member, the at least one hook member gearingly engages with the transmitting member.

7. The latching mechanism of claim 6, wherein the transmitting member comprises a transmitting post, at least two drive gears fixed to the transmitting post, and at least one slave gear gearingly engaging with the second actuating member, one of the at least two drive gears gearingly engages with the second actuating member, the other one of the at least two drive gears gearingly engages with the at least one slave gear.

8. The latching mechanism of claim 6, wherein the hook assembly further comprises a second elastic member, the second elastic member abuts the second actuating member and drives the at least one hook members to be hidden in the cover when the cover is unlatched from the main body and the second actuating member is released.

9. An electronic device, comprising:
a main body;
a cover rotatably coupled to the main body; and a latching mechanism for latching the cover to the main body, the latching mechanism comprising a latching assembly secured to the main body and a hook assembly secured to the cover; the latching assembly comprising at least one latching member slidably received in the main body; the hook assembly comprising at least one hook member, the at least one hook member capable of engaging with the at least one latching member to latch the cover to the main body, and capable of disengaging from the at least one latching member to allow the cover to be unlatched from the main body;

wherein the at least one hook member is hidden in the cover when the cover is unlatched from the main body, and the at least one hook member is operable to extend out of the cover to engage with the at least one latching member to latch the cover to the main body; and wherein the hook assembly further comprises a second actuating member and a transmitting member gearingly engaging with the second actuating member, the at least one hook member gearingly engages with the transmitting member, the second actuating member drives at least one the hook member to extend out of the cover when pressed; the transmitting member comprises a transmitting post, at least two drive gears fixed to the transmitting post, and at least one slave gear gearingly engaging with the second actuating member, one of the at least two drive gears gearingly engages with the second actuating member, the other one of the at least two drive gears gearingly engages with the at least one slave gear.

10. The electronic device of claim 9, wherein the at least one latching member is capable of sliding between a locking position and an unlocking position, the at least one latching member hooks the at least one hook member to latch the cover to the main body when in the locking position, and allows the at least one hook member to disengage with the at least one latching member to unlatch the cover from the main body when in the unlocking position.

11. The electronic device of claim 9, wherein the latching assembly further comprises a first actuating member slidably secured to the main body, the first actuating member is operable to drive the at least one latching member to slide from the locking position to the unlocking position.

12. The electronic device of claim 11, wherein the latching assembly further comprises at least one connecting post, that at least one connecting post abuts the first actuating member, the at least one latching member is secured to an end of the at least one connecting post away from the first actuating member.

13. The electronic device of claim 12, wherein the first actuating member defines at least one inclined surface, the at least one connecting post abuts the at least one inclined surface.

14. The electronic device of claim 11, wherein the latching assembly further comprises at least one first elastic member, the at least one first elastic member abuts an end of the at least one latching member opposite to the first actuating member and is used to drive the at least one latching member to slide from the unlocking position to the locking position when the first actuating member is released.

15. The electronic device of claim 9, wherein the hook assembly further comprises a second elastic member, the second elastic member abut the second actuating member and drives the at least one hook members to be hidden in the cover when the cover is unlatched from the main body and the second actuating member is released.

\* \* \* \* \*